(12) United States Patent
Yoshida

(10) Patent No.: US 6,220,143 B1
(45) Date of Patent: Apr. 24, 2001

(54) ROTARY CYLINDER DEVICE

(75) Inventor: Shin Yoshida, Nagoya (JP)

(73) Assignee: Howa Machinery, Ltd., Aichi-ken (JP)

(*) Notice: Subject to any disclaimer, the term of this patent is extended or adjusted under 35 U.S.C. 154(b) by 0 days.

(21) Appl. No.: 09/200,997

(22) Filed: Nov. 30, 1998

(30) Foreign Application Priority Data

Dec. 4, 1997 (JP) .................................................. 9-352416
Dec. 25, 1997 (JP) .................................................. 9-368072

(51) Int. Cl.[7] .................................................. F01B 31/12
(52) U.S. Cl. .................................................. 92/5 R; 92/106
(58) Field of Search .................................................. 92/106, 5 R

(56) References Cited

U.S. PATENT DOCUMENTS 4,040,338 * 8/1977 Wilson et al. ..................... 92/106
4,996,908   3/1991 Thompson .

FOREIGN PATENT DOCUMENTS 61-241505  10/1986 (JP) .
63-41689    8/1988 (JP) .

* cited by examiner

Primary Examiner—Edward K. Look
Assistant Examiner—Thomas E. Lazo
(74) Attorney, Agent, or Firm—Ladas & Parry

(57) ABSTRACT

A rotary cylinder for controlling operations of a chuck to be used on a lathe or the like. The rotary cylinder comprises a housing, a cylinder unit, a distributor supporting the cylinder unit in bearings fitted therein, and a seizure detecting system including a detaining mechanism for restraining the distributor from rotation relative to the housing. The seizure detecting system detects seizure between the distributor and the cylinder unit and allows the distributor to rotate relative to the housing. The distributor is capable of being fixedly held on the housing without distorting the bearings supporting the cylinder unit and of being disconnected from the housing when seizure occurs between the distributor and the cylinder unit.

8 Claims, 5 Drawing Sheets

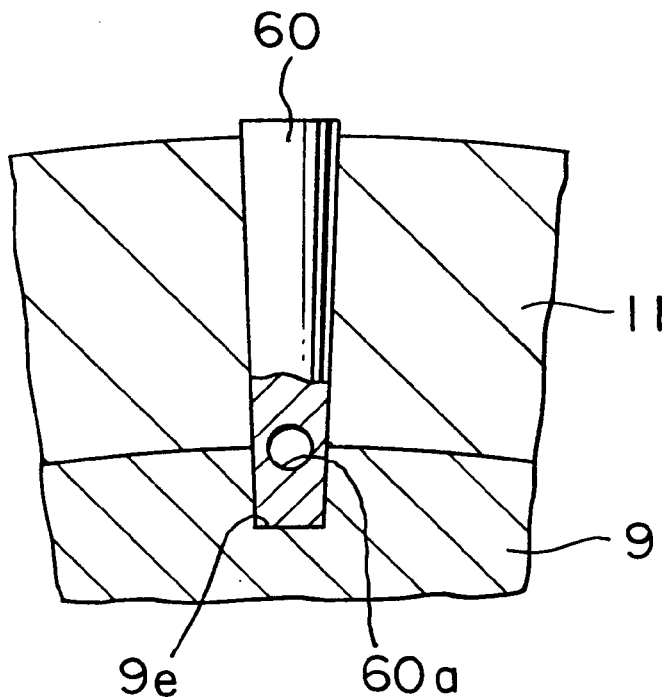
F I G. 7
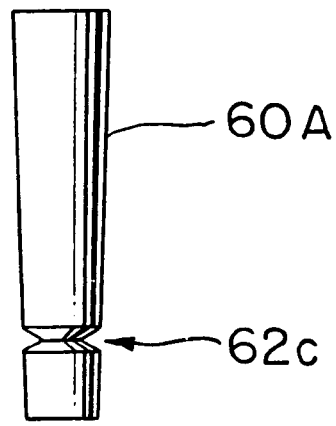
F I G. 8

ROTARY CYLINDER DEVICE

BACKGROUND OF THE INVENTION

1. Field of the Invention

The present invention relates to a rotary cylinder device for controlling operations of a chuck to be used on a lathe or the like.

2. Description of the Related Art

Generally, a rotary cylinder device is constructed by fitting a piston axially sidably in a cylinder unit, supporting the cylinder unit for rotation in a bearing on a distributor, and fitting the distributor in an annular draining space formed in a housing. A rotary cylinder device disclosed in JP-B-63-41689 (reference 1) has a distributor positioned and held fixedly in place in an annular space with a bolt screwed in a housing so that its tip is pressed against the distributor. Another rotary cylinder device disclosed in JP-A-61-241505 (reference 2) has a distributor held fixedly in place in an annular space with a bolt screwed in a housing so that its free end part is fitted in a radial hole formed in the distributor.

Vibrations may be generated in those prior art rotary cylinder devices if the distributor makes a slight turning movement in a direction opposite to a direction in which the cylinder unit rotates at a high rotational speed. Therefore, the distributor is fastened to the housing with the bolt as mentioned in the references 1 and 2. In the reference 1, the bolt is pressed against a part of the distributor separated from an annular groove, such as an oil passage, formed in the distributor and hence the bolt is pressed unavoidably against a part of the distributor near the bearing. Consequently, it is possible that the bearing is distorted by pressure exerted on the distributor by the bolt. In the reference 2, if foreign matters are caught in the thin annular space between the distributor and the cylinder unit and cause seizure between the distributor and the cylinder unit, the distributor is forced to rotate together with the cylinder unit. Therefore, it is possible that the torque of the cylinder unit is transmitted through the distributor and the bolt to the housing and the housing is forced to rotate together with a high-pressure hose connected thereto.

Seizure between the cylinder unit and the distributor can be known from the excessive rise of load on the spindle motor of a lathe or the like. However, the excessive load that may be produced by seizure between the cylinder unit and the distributor and may be exerted on the spindle motor must be greater than a load corresponding to a cutting force necessary for machining. Therefore, the rotary cylinder device may be damaged seriously and troubles will occur before seizure between the cylinder unit and the distributor is detected.

SUMMARY OF THE INVENTION

Accordingly, it is an object of the present invention to provide a rotary cylinder device comprising a housing, a cylinder unit, and a distributor supporting the cylinder unit in bearings fitted therein and capable of being fixedly held on the housing without distorting the bearings supporting the cylinder unit and of being disconnected from the housing when seizure occurs between the distributor and the cylinder unit.

Another object of the present invention is to provide a rotary cylinder device comprising a cylinder unit, a distributor, and a seizure detecting means for detecting seizure between the cylinder unit and the distributor.

According to the present invention, a rotary cylinder device comprises: a cylinder unit having a distributor support member and a piston chamber therein, and a piston axially slidably fitted in the piston chamber; a distributor supported for rotation on a support part of the distributor support member; and a housing defining an annular draining space and provided with a side wall defining a bore closely receiving the distributor therein; and a detaining mechanism for restraining the distributor from rotation relative to the housing, said detaining mechanism including a protrusion provided for one of the housing and the distributor, and a recess provided in the other of the housing and the distributor and tightly receiving the protrusion, said protrusion being adapted to be forced to move out of the recess to allow the rotation of the distributor relative to the housing when a torque exceeding a threshold torque is exerted on the distributor.

The rotary cylinder device may further comprise a seizure detecting system capable of detecting the rotation of the distributor together with the cylinder unit due to seizure or the like.

The above and other objects, features and advantages of the present invention will become more apparent from the following description taken in connection with the accompanying drawings.

BRIEF DESCRIPTION OF THE DRAWINGS

FIG. 7 is a sectional view of a detaining mechanism in a fourth modification; and FIG. 8 is a sectional view of a detaining mechanism in a fifth modification.

DESCRIPTION OF THE PREFERRED EMBODIMENTS

Figure 1:
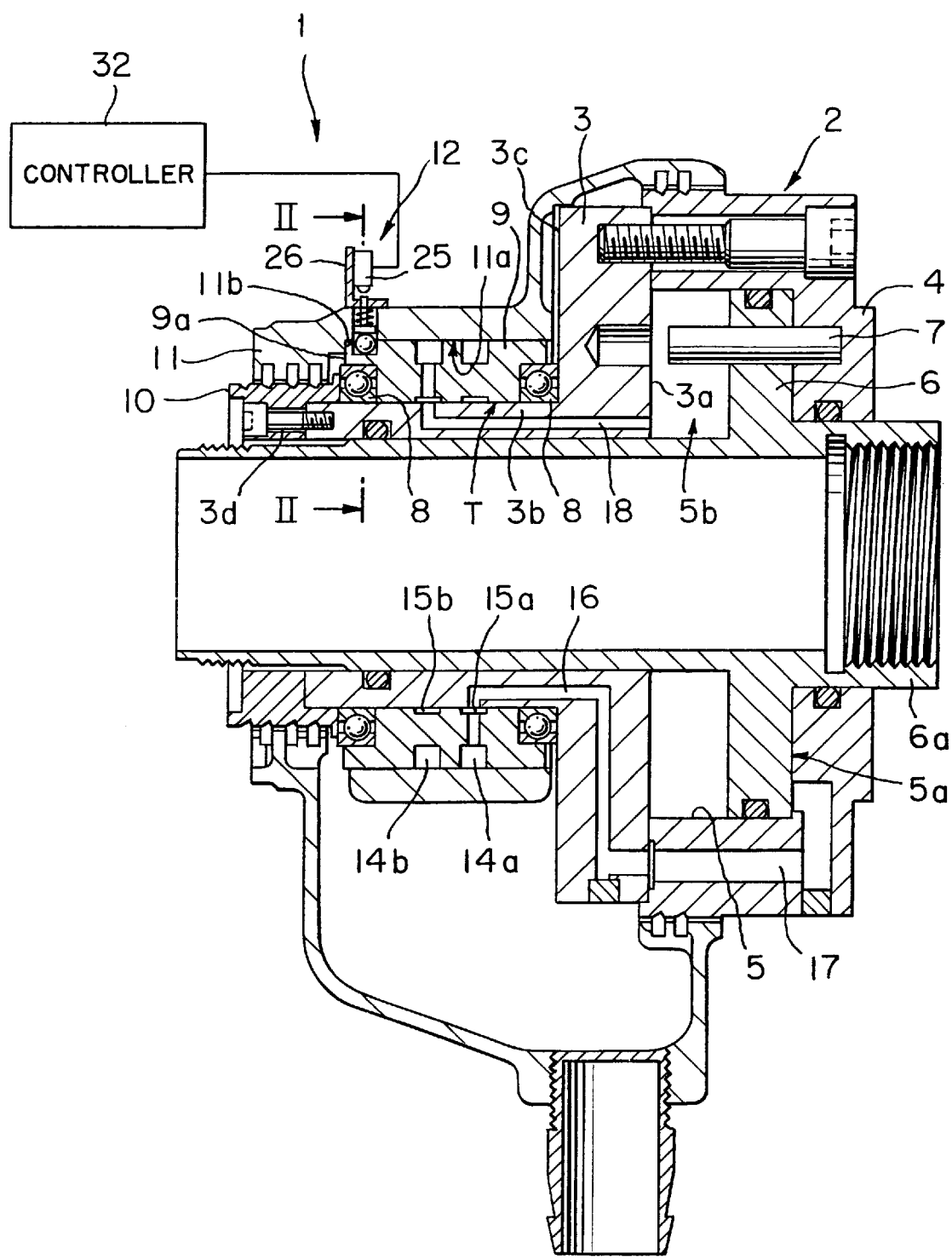
FIG. 1 is a longitudinal sectional view of a rotary cylinder in a preferred embodiment of the present invention.
Figure 2:
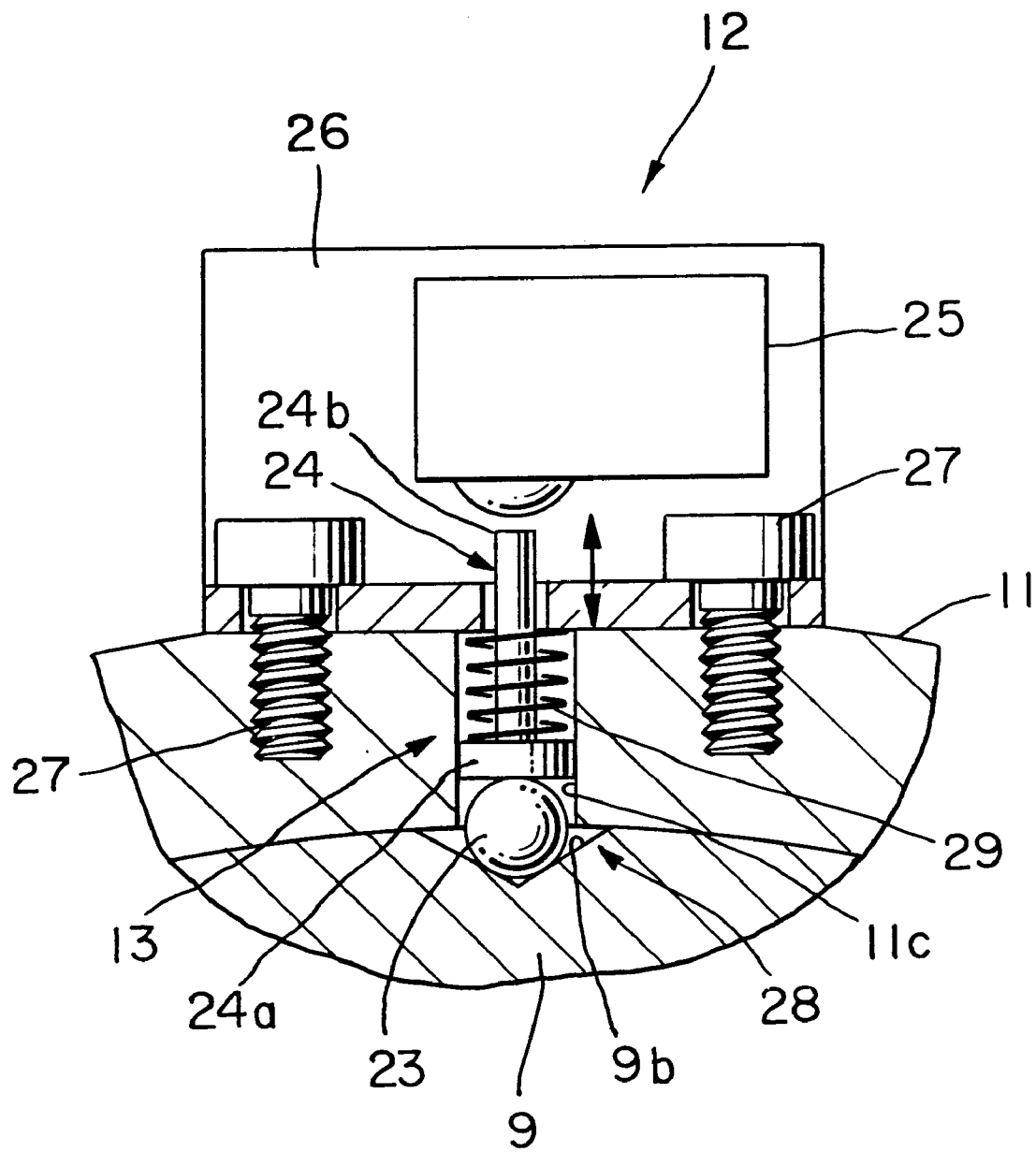
FIG. 2 is an enlarged sectional view taken on line II—II in FIG. 1.

Referring to FIG. 1 illustrating a rotary cylinder 1 in a preferred embodiment of the present invention, the rotary cylinder 1 has a cylinder unit 2 constructed by attaching a cup-shaped rod cover 4 to a distributor support shaft 3 so as to cover the front end surface 3a of the distributor support shaft 3 and to define a cylindrical piston chamber 5. A piston 6 is axially slidably fitted in the piston chamber 5 of the cylinder unit 2. The piston 6 divides the piston chamber 5 into a front pressure chamber 5a and a rear pressure chamber 5b. The piston 6 is restrained from rotation relative to the cylinder unit 2 by a pin 7 fixed thereto. A reduced rear part 3b of the distributor shaft 3 is supported in a pair of bearings 8 fitted in a front and a rear end part of a distributor 9. The front bearing 8 fitted in the front end part of the distributor 9 is retained in place by the rear end surface 3c of the distributor shaft 3, and the rear bearing 8 fitted in the rear end part of the distributor 9 is retained in place by an end cap 10 attached to the rear end surface 3d of the distributor shaft 3. The cylindrical distributor 9 is fitted in a cylindrical draining bore 11a formed in a housing 11, for rotation relative to the housing 11. The rear end surface 9a of the distributor 9 is in contact with an inner flange 11b formed in a rear end part of the housing 11. The housing 11 is provided with a seizure detecting system 12, which will be described later, for detecting seizure between the cylinder unit 2 and the distributor 9. As shown in FIG. 2, the seizure detecting system 12 has a detecting device 13 engaged with the distributor 9 to restrain the distributor 9 from rotation.

The distributor 9 is provided in its outer circumference with a first outer annular groove 14a and a second outer annular groove 14b for supplying a fluid into the front pressure chamber 5a and the rear pressure chamber 5b, respectively. The outer annular grooves 14a and 14b are connected to a pair of ports, not shown formed in the housing 11 at positions axially and circumferentially separated from each other, respectively. The ports are connected by hoses, not shown, to a fluid source, not shown. The distributor 9 is provided in its inner circumference with a first inner annular groove 15a and a second inner annular groove 15b, the first inner annular groove 15a is connected by a passage 16 formed in the distributor shaft 3 and a passage 17 formed in the rod cover 4 to the front pressure chamber 5a. The second inner annular groove 15b is connected by a passage 18 formed in the distributor shaft 3 to the rear pressure chamber 5b.

Figure 3:
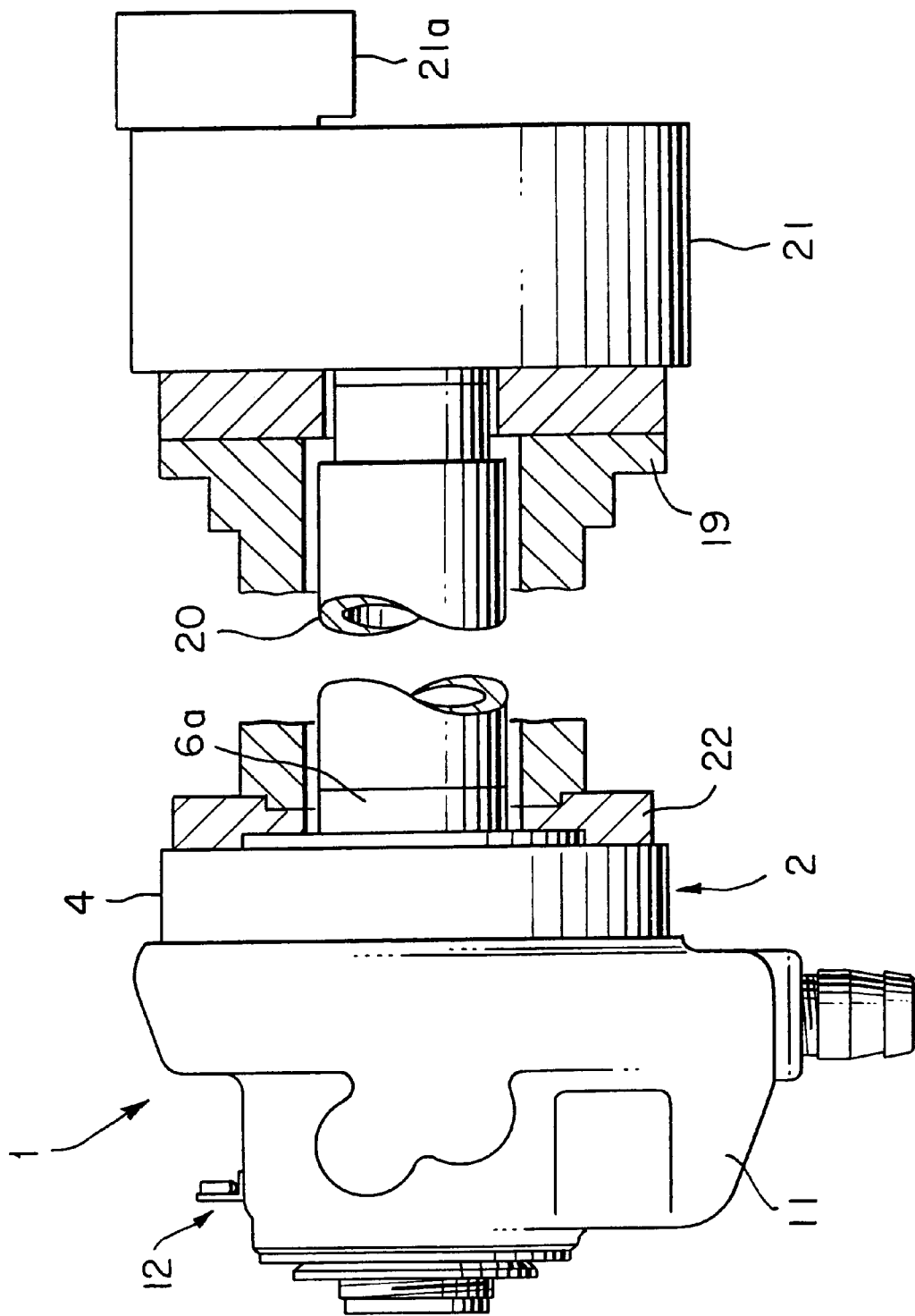
FIG. 3 is a partly sectional front view of the rotary cylinder of FIG. 1 as mounted on a spindle.

The piston 6 has a hollow piston rod 6a having an internally threaded front end part. As shown in FIG. 3, a connecting pipe 20 coaxial with a spindle 19 included in a machine tool is screwed in the internally threaded front end part of the piston rod 6a. The connecting pipe 20 is connected to a chuck 21 attached to the front end of the spindle 19. The piston 6 is reciprocated by the pressure of the fluid supplied into the cylindrical piston chamber 5 to operate jaws 21a included in the chuck 21. The rear end of the spindle 19 is connected to the front end of the rod cover 4 by an adapter 22 so that the cylinder unit 2 rotates together with the spindle 19 and the chuck 21.

As indicated in FIG. 2, the seizure detecting system 12 comprises a part of the housing 11 provided with a radial through hole 11c, a steel ball 23 put in the radial through hole 11c, a detecting rod 24 axially movably inserted in the radial through hole 11c so that an enlarged inner end 24a thereof is in contact with the steel ball 23, a bracket 26 fastened to the housing 11 with bolts 27 so as to cover the radial through hole 11c, a spring 29 disposed between the bracket 27 and the inner end 24a of the detecting rod 24 in the radial through hole 11c so as to press the steel ball 23 (protrusion) through the rod 24 against the distributor 9, a part of the distributor 9 provided with a recess 9b receiving a part of the steel ball 23 therein to form a linking device 28 for restraining the rotation of the housing 11 and the distributor 9 relative to each other, and a switch 25 held on the bracket 26 so as to be operated by the detecting rod 24.

An outer end part of the detecting rod 24 projects through a hole formed in the bracket 26 from the outer surface of the bracket 26. If an excessive torque is exerted on the distributor 9, the steel ball 23 is forced to move out of the recess 9b to allow the distributor 9 to rotate relative to the housing 11, and the detecting rod 24 is pushed radially outward by the steel ball 23 so that the outer end 24b of the detecting rod 24 is pressed against the actuator of the switch 25 to close the switch 25. Then, a detection signal is transmitted through the switch 25.

When the distributor 9 is turned from a predetermined position (FIG. 2) relative to the housing 11, the steel ball 9 is forced to move out of the recess 9b formed in the distributor 9, and the switch detects the movement of the outer end 24b of the detecting rod 24. The detecting device 13 having the steel ball 23 and the detecting rod 24 may be substituted by a single pin-shaped detecting member 13 shown in FIG. 4.

Figures 4, 5:
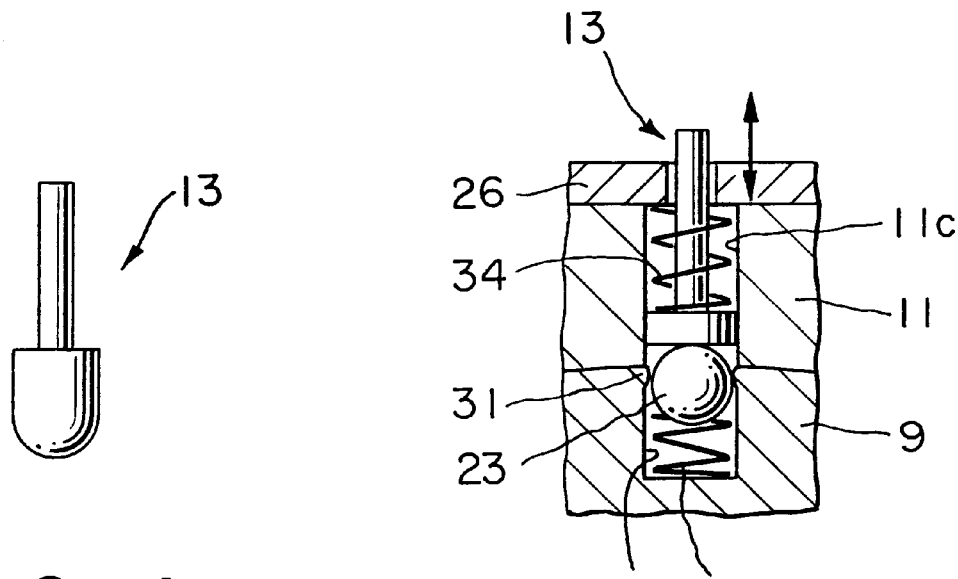
FIG. 4 is a front view of a pin, explaining a detaining mechanism and a seizing detecting system in a modification.
FIG. 5 is a sectional view of a detaining mechanism and a seizing detecting system in another modification.

FIG. 5 shows a seizure detecting system in a modification. In the seizure detecting system shown in FIG. 5, a steel ball 23 is put radially movably in a radial hole 9c formed in the distributor 9, the steel ball 23 is biased radially outward by a spring 30 disposed in the radial hole 9c on the inner side of the steel ball 23, the steel ball 23 is kept in the radial hole 9c by a retaining protrusion 31, and the detecting device 13 is inserted in a through hole 11c formed in the housing 11 and is pressed against the steel ball 23 by a spring 34. If the distributor 9 is turned from the predetermined position relative to the housing 11, the steel ball 23 is forced to sink into the radial hole 9c and the detecting device 13 is moved radially inward.

The cylinder unit 2 of the rotary cylinder 1 is driven for rotation at a high rotational speed by a spindle motor, not shown, included in a lathe or the like. If foreign matters are caught in an annular space T between the distributor 9 and the reduced rear part 3b of the cylinder unit 2, seizure between the distributor 9 and the cylinder unit 2 occurs. The torque of the cylinder unit 2 tries to rotate all the components of the rotary cylinder 1. The distributor 9 is restrained from rotation relative to the housing 11 by the steel ball 23 received in the recess 9b formed in the distributor 9. However, the steel ball 23 is forced to move out of the recess 9c to allow the distributor 9 to rotate relative to the housing 11 if an excessive torque greater than a threshold is exerted on the housing 11. Consequently, the steel ball 23 pushes the detecting rod 24 radially outward, the detecting rod 24 closes the switch 25, a stop signal is transmitted through the switch 25 to a controller 32 for controlling the spindle motor, not shown, and the controller 32 provides a stop signal to stop the spindle motor. Thus, the seizure detecting system 12 detects quickly seizure between the cylinder unit 2 and the distributor 9 and stops the rotation of the cylinder unit 2 to limit the breakage of the rotary cylinder 1 to the least unavoidable extent. When the steel ball 23 is forced to move out of the recess 9c formed in the distributor 9 to move the detecting rod 24 radially outward in the through hole 11c formed in the housing 11, the distributor 9 is released from the housing 11. Consequently, the housing remains stationary even if the distributor 9 rotate together with the cylinder unit 2, and hence it is possible to avoid the danger of the high-pressure hoses connected to the housing 11 being flung around. Since the distributor 9 is restrained from rotation by a circumferential force acting between the steel ball 23 and the surface of the recess 9b, any radial pressure is not exerted on the bearings 8 and hence the bearings 8 are not distorted.

Although the distributor 9 is restrained from rotation relative to the housing 11 by the steel ball 23 or the detecting member 13 (FIG. 4) in this embodiment, the distributor 9 may be restrained from rotation relative to the housing 11 by a detaining mechanism separate from the seizure detecting system 12. The seizure detecting system 12 may detect the rotation of the distributor 9 from the predetermined angular position by attaching an indicator, such as a reflector or a magnet, to a predetermined position on, for example, the circumference of the distributor 9, and sensing the movement of the indicator by a sensor, such as a proximity switch, attached to the housing 11 instead of detecting the same by the radial movement of the detecting device 13.

Figure 6:
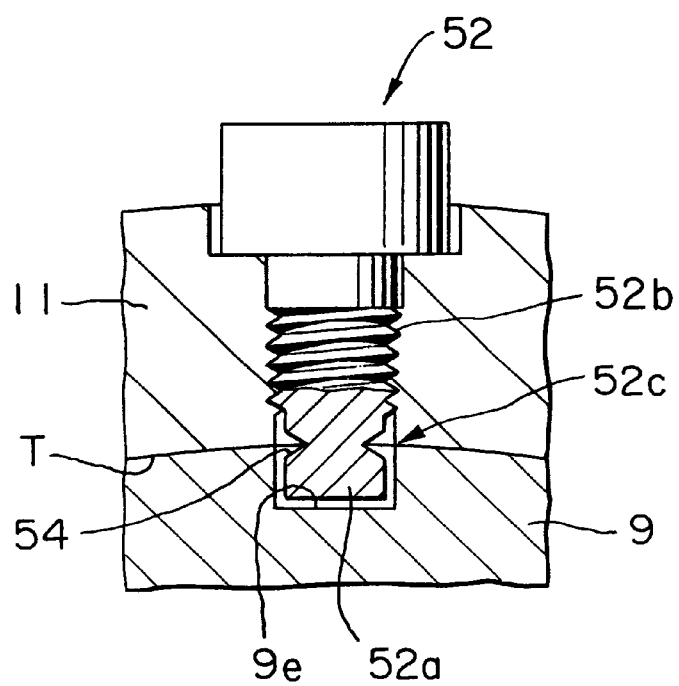
FIG. 6 is a sectional view of a detaining mechanism in a third modification.

Referring to FIG. 6 showing a detaining mechanism in a modification, a bolt 52 is screwed in the housing 11 so that its end part 52a projects from the inner circumference of the housing 11 into a recess 9e of a predetermined depth formed in the outer circumference of the distributor 9. A neck 52c is formed in a part of the bolt 52 corresponding to the boundary between the inner circumference of the housing 11 and the outer circumference of the distributor 9, i.e., a part between the end part 52a and a threaded part 52b of the bolt 52, by forming an annular groove 54 in the same part. The diameter of the neck 52c is determined so that the neck 52c is sheared off when a breaking torque slightly smaller than a torque that will be exerted on the distributor 9 when seizure is caused between the distributor 9 and the reduced rear part 3b of the distributor shaft 3 of the cylinder unit 2 by foreign matters caught in the annular space T between the reduced rear part 3b of the distributor shaft and the distributor 9 is exerted on the distributor 9.

When a torque exceeding the breakage torque is exerted on the distributor 9, the neck 52c of the bolt 52 is sheared off and the end part 52a of the bolt 52 is separated from the threaded part 52b. Consequently, the distributor 9 is allowed to rotate relative to the housing 11, the housing 11 remains stationary and hence the high-pressure hoses connected to the housing 11 are not flung around.

The distributor 9 is provided with the recess 9e in this modification, a seizure detecting system in another modification, a bolt 52 having an end part 52a, a threaded part 52b, and a neck 52c formed between the end part 52a and the threaded part 52b may be attached to the distributor 9 so that the end part 52a projects from the outer circumference of the distributor 9 into a recess 9e formed in the housing 11.

As shown in FIG. 7, a pin 60, such as a taper pin, having an outer end part and an inner end part, and provided with a through hole 60a perpendicular to the axis of the pin 60 in a part thereof between the outer and the inner end part may be driven into a through hole formed in the housing 11 so that the through hole 60a is located on the boundary between the distributor 9 and the housing 11 and the inner end part is fitted in a hole 9e formed in the distributor 9.

As shown in FIG. 8, a pin 60A having an inner end part and an outer end part, and provided with a neck 62c may be used instead of the pin 60 shown in FIG. 7. The pin 60A is driven into the through hole formed in the housing 11 so that the neck 60c is located on the boundary between the distributor 9 and the housing 11 and the inner end part is fitted in the hole 9e formed in the distributor 9.

As is apparent from the foregoing description, according to the present invention, the distributor is restrained from rotation relative to the housing by putting a protrusion projecting radially inward from the housing in the recess formed in the: distributor, while the distributor is allowed to rotate relative to the housing when a torque exceeding the predetermined threshold torque is exerted on the distributor. Therefore, the distortion of the bearing fitted in the distributor can be prevented, the housing can be kept stationary even if an excessive torque is exerted on the distributor due to seizure between the cylinder unit and the distributor, and the accidental flinging of the high-pressure hoses connected to the housing can be avoided.

The rotation of the distributor together with the cylinder unit due to seizure or the like can be detected and rotation of the cylinder unit can be stopped upon the detection of the rotation of the distributor, so that the breakage of the rotating cylinder can be limited to the least unavoidable extent. Since the rotation of the distributor relative to the housing is detected through the detection of the radial movement of the detecting device, the rotation of the distributor relative to the housing can be easily and surely detected and the rotation of the housing is prevented.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A rotary cylinder device comprising:
   a cylinder unit having a distributor support member and a piston chamber therein, and a piston axially slidably fitted in the piston chamber;
   a distributor supported for rotation on a support part of the distributor support member;
   a housing defining an annular draining space and provided with a side wall defining a bore closely receiving the distributor therein;
   a detaining mechanism for restraining the distributor from rotation relative to the housing, said detaining mechanism including a protrusion provided for the housing and a recess provided in the distributor and tightly receiving the protrusion, said protrusion being adapted to be forced to move out of the recess to allow the rotation of the distributor relative to the housing when a torque exceeding a threshold torque is exerted on the distributor; and
   a seizure detecting system for detecting the rotation of the distributor together with the cylinder unit due to seizure, said seizure detecting system including:
      a detecting member slidably received in said housing for radial movement relative to the housing and associated with said protrusion such that the detecting member will be moved radially outward when said protrusion is forced to move out of the recess, and
      a detection signal generating means for detecting the radial movement of the detecting member and generating a detection signal upon the detection of the radially outward movement of the detecting member.

2. The rotary cylinder device according to claim 1, wherein said protrusion is a ball.

3. The rotary cylinder device according to claim 1, wherein said detecting member and said protrusion constitute a single pin-shape member.

4. The rotary cylinder device according to claim 1, wherein said protrusion is biased radially outward.

5. The rotary cylinder device according to claim 1, wherein said detecting member is biased radially inward.

6. A rotary cylinder device comprising:
   a cylinder unit having a distributor support member and a piston chamber therein, and a piston axially slidably fitted in the piston chamber;
   a distributor supported for rotation on a support part of the distributor support member;
   a housing defining an annular draining space and provided with a side wall defining a bore closely receiving the distributor therein;
   a detaining mechanism for restraining the distributor from rotation relative to the housing, said detaining mechanism including a protrusion provided for the housing and a recess provided in the distributor and tightly receiving the protrusion, said protrusion being adapted to be forced to move out of the recess to allow the rotation of the distributor relative to the housing when a torque exceeding a threshold torque is exerted on the distributor; and a seizure detecting system for detecting the rotation of the distribution together with the cylinder unit due to seizure, said seizure detecting system including:

an indicating means disposed at a predetermined position on the distributor; and a sensing means for sensing the movement of the indicating means.

7. The rotary cylinder device according to claim 6, wherein said protrusion is a ball.

8. The rotary cylinder device according to claim 6, wherein said protrusion is biased radially outward.

* * * * *